United States Patent [19]

Mansfield et al.

[11] Patent Number: 5,034,952
[45] Date of Patent: Jul. 23, 1991

[54] LASER FOR HIGH FREQUENCY MODULATED INTERFEROMETRY

[75] Inventors: Dennis K. Mansfield, E. Windsor; Michael Vocaturo, Columbus; Lawrence J. Guttadora, Iselin, all of N.J.

[73] Assignee: The United States of America as represented by the United States Department of Energy, Washington, D.C.

[21] Appl. No.: 446,345

[22] Filed: Dec. 5, 1989

[51] Int. Cl.[5] ............................................. H01S 3/10
[52] U.S. Cl. ........................................ 372/26; 372/4; 372/29; 372/20
[58] Field of Search ................... 372/4, 32, 29, 18, 20

[56] References Cited

U.S. PATENT DOCUMENTS 3,842,367 10/1974 Schlossberg ............................ 372/32
3,921,099 11/1975 Abrams et al. ......................... 372/32

OTHER PUBLICATIONS

Design of Molecular Fir Lasers Frequency Tunable by Stark Effect: Electric Breakdown of $CH_3OH$, $CH_3F$, $CH_3I$ and $CH_3CN$/Bionducci et al., Infrared Physics, 1979, pp. 297–308.

Multichannel Far-Infrared Laser Interferometer for Electron Density Measurements on the Tokamak Fusion Test Reactor / Mansfield et al., Applied Optics, vol. 26, pp. 4469–4474, Oct. 15, 1987.

Primary Examiner—Leon Scott, Jr.
Attorney, Agent, or Firm—Helen S. Cordell; John M. Albrecht; William R. Moser

[57] ABSTRACT

A Stark-tuned laser operating in the 119 micron line of $CH_3OH$ has an output power of several tens of milliwatts at 30 Watts of pump power while exhibiting a doublet splitting of about ten MHz with the application of a Stark field on the order of 500 volts/cm. This output power allows for use of the laser in a multi-channel interferometer, while its high operating frequency permits the interferometer to measure rapid electron density changes in a pellet injected or otherwise fueled plasma such as encountered in magnetic fusion devices. The laser includes a long far-infrared (FIR) pyrex resonator tube disposed within a cylindrical water jacket and incorporating charged electrodes for applying the Stark field to a gas confined therein. With the electrodes located within the resonator tube, the resonator tube walls are cooled by a flowing coolant without electrical breakdown in the coolant liquid during application of the Stark field. Wall cooling allows for substantially increased FIR output powers. Provision is made for introducing a buffer gas into the resonator tube for increasing laser output power and its operating bandwidth.

19 Claims, 8 Drawing Sheets

LASER FOR HIGH FREQUENCY MODULATED INTERFEROMETRY

CONTRACTUAL ORIGIN OF THE INVENTION

The United States government has rights in this invention under Contract No. DE-AC02-76-CHO3073 between the U.S. Department of Energy and Princeton University.

BACKGROUND OF THE INVENTION

This invention relates generally to high frequency modulated interferometry and is particularly directed to a Stark-tuned, modulated far-infrared (FIR) laser particularly adapted for measuring rapidly changing plasma electron densities in a magnetically confined plasma.

A number of approaches are currently being evaluated in the development of nuclear fusion as a long term energy source. Research in this area has lead to the finding that one of the most efficient configurations for optimum plasma containment is in the form of a toroid or donut. This has given rise to the tokamak fusion reactor design which is currently under intensive study by research groups in a number of countries. In this approach, a circular arrangement of powerful magnets forms a toroidal magnetic field wherein is confined an energetic plasma comprised primarily of protons and deuterons. Confining the highly energetic plasma at extremely high temperatures and densities causes the fusing of atoms, such as deuterium and tritium, and the resulting production of energy. High energy electrons arising from charge exchange collisions are also produced in the plasma.

Measurement of plasma electron density has proven to be an important diagnostic tool in measuring various characteristics of the magnetically confined, energetic plasma. Plasma electron density is typically performed using a frequency modulated interferometer employing far-infrared (FIR) lasers. In this approach, a laser beam is modulated by either mechanical means, such as by a rotating grating, or by optical means involving the beating together of two frequency-shifted FIR lasers. In the former case, modulation frequencies are limited by mechanical constraints to $10^4–10^5$ Hz, while in the latter case modulation is limited to about 1 MHz because of the very narrow gain bandwidth exhibited by submillimeter lasers. In practice, because of the relatively low modulation frequency of current interferometer systems, rapid changes in the density of the confined plasma result in a loss of fringe count in the interferometric measurements. Rapid plasma density changes are caused by the injection of solid pellets into the plasma core, by sudden loss of confinement due to major plasma disruption, or by fast magnetohydrodynamic (MHD) activity excited in the plasma core. Each of these phenomena has been the cause of density changes which are rapid enough to cause fringe loss in the plasma diagnostic interferometer system such as that employed in the tokamak fusion test reactor (TFTR) presently operating at Princeton Plasma Physics Laboratory. Prior approaches for measuring plasma electron density in the TFTR have made use of a pair of $CH_3OH$ lasers operating at 119 microns and at a modulation frequency of 1 MHz. Not only does the limited bandwidth of prior art laser systems limit plasma density measurement accuracies, but the limited output power of these systems also restricts their utility as plasma diagnostic tools.

The present invention is intended to overcome the aforementioned limitations of the prior art by providing a high frequency, modulated laser system for use in an interferometer system for accurately measuring electron density in a high temperature, magnetically confined plasma. The laser system employs a Stark-tuned laser operating on the 119 micron line of $CH_3OH$ having an increased output power while exhibiting a higher frequency doublet splitting modulation frequency. The laser includes a resonator cavity design which affords the aforementioned high output power and high frequency doublet splitting in a system particularly adapted for use with a multi-channel interferometer such as employed on large-scale plasma devices used in magnetic fusion research.

OBJECTS AND SUMMARY OF THE INVENTION

Accordingly, it is an object of the present invention to accurately measure electron density in a high temperature, magnetically confined plasma.

It is another object of the present invention to measure plasma electron density in a magnetic fusion device using high frequency modulated plasma interferometry.

A further object of the present invention is to provide a high power, high modulation frequency, Stark-tuned laser for use in the interferometric measurement of fusion plasma densities.

A still further object of the present invention is to accurately measure the rapidly changing density of a magnetically confined plasma using a Stark-tuned doublet laser without a loss of fringe count.

Another object of the present invention is to provide an improved Stark-tuned laser arrangement capable of operating at high frequencies for more accurate interferometric measurements and increased output power.

Another object of the present invention is to provide a single Stark-tuned $CH_3OH$ laser particularly adapted for use in a plasma interferometer such as used in measuring magnetic fusion device operation.

Still another object of the present invention is to provide a Stark-tuned laser having a long far-infrared (FIR) resonator tube containing charged electrodes and disposed within a cylindrical water jacket which provides enhanced FIR output power without the risk of electrical breakdown upon application of an electric field.

This invention contemplates apparatus for providing a high frequency modulated beam to an interferometer, the apparatus comprising: a housing having an input end and an output end and a channel extending the length thereof; means for defining a resonant cavity within and extending the length of the housing, wherein the cavity contains a gas; means for exciting the gas to a lasing state; charged means disposed within the cavity for applying an electric field to the gas in the lasing state to split a resonant frequency of the gas into first and second frequencies and provide a high frequency modulated beam from the output end of the housing; and temperature control means disposed within the channel in the housing and about the means defining the resonant cavity for preventing electrical breakdown of the gas upon the application of large electric fields thereto.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DESCRIPTION OF THE PREFERRED EMBODIMENT

Figure 1:
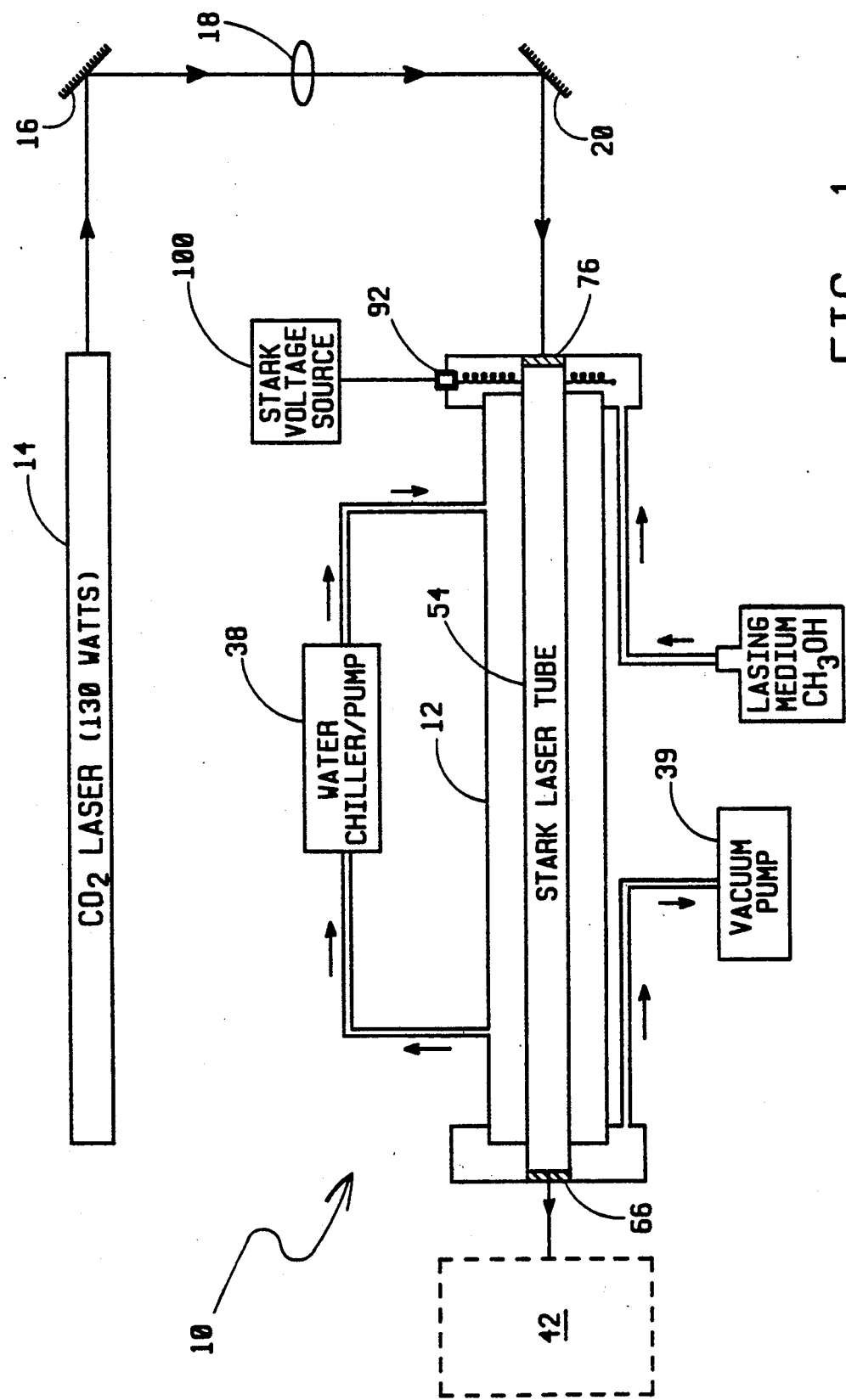
FIG. 1 is a simplified schematic and block diagram of a Stark-tuned laser for use in high frequency modulated interferometry in accordance with the principles of the present invention.

Referring to FIG. 1, there is shown a simplified, combined schematic and block diagram of a Stark-tuned FIR laser 10 in accordance with the present invention. The FIR laser 10 includes a resonator housing 12 containing optically pumped $CH_3OH$ gas. A $CO_2$ pump laser 14 which includes a quartz discharge tube housed in a 2 meter cavity directs a 9.7 micron laser beam via flat gold reflectors 16 and 20 and a focusing lens 18 and to one end of the resonator housing 12. The focusing lens 18 is preferably comprised of ZnSe having a 0.75 meter focal length and a 10 meter radius of curvature for focusing the $CO_2$ laser beam at the input end of the resonator housing 12. The addition of approximately 1% Xenon to the $CO_2$ gas mixture in the laser 14 provides an approximately 10% power increase.

Figure 2:
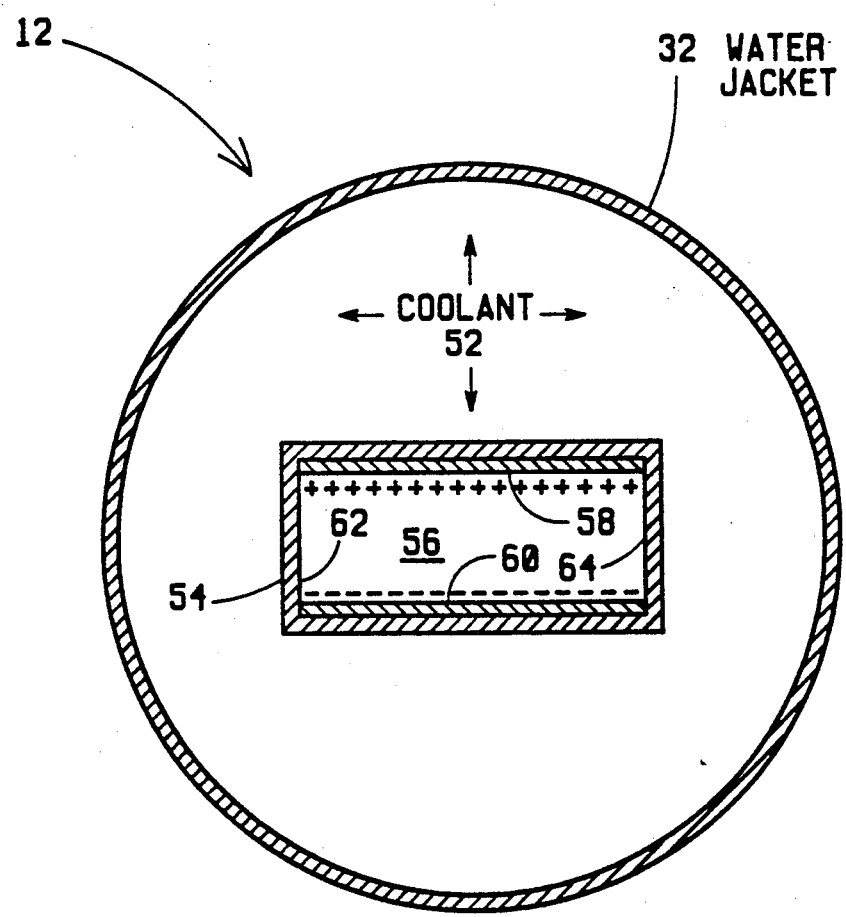
FIG. 2 is a transverse, sectional view of an FIR resonator tube for use in the Stark-tuned laser of FIG. 1.
Figure 3:
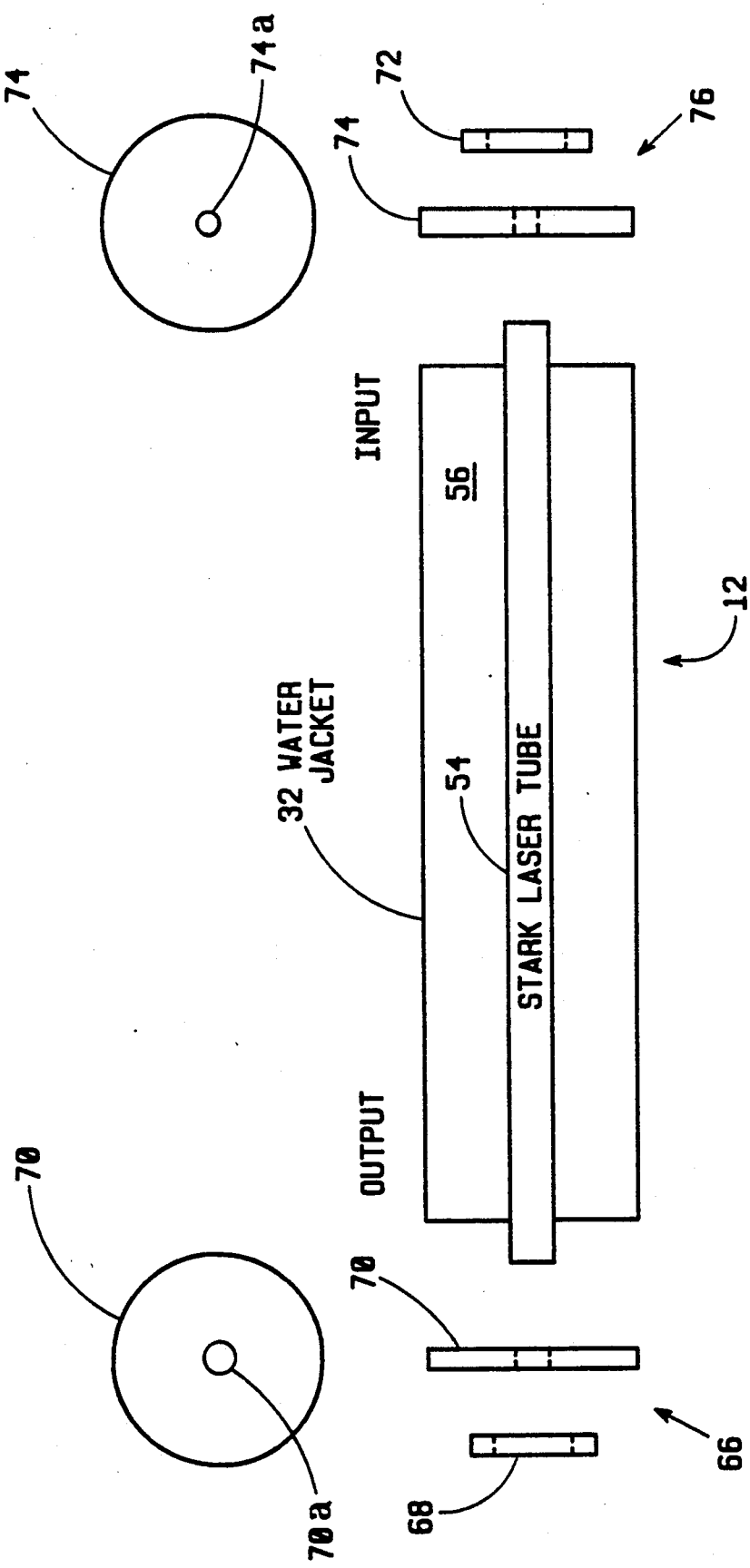
FIG. 3 is a lateral sectional view showing additional details of the FIR resonator tube portion of the Stark-tuned laser of FIG. 1.

Disposed within and along the length of the resonator housing 12 is a generally rectangular tube 54 as shown in the sectional view of FIG. 2. The rectangular tube 54 is preferably comprised of pyrex and defines a resonant cavity 56 within which the optically pumped $CH_3OH$ gas (lasing medium) is disposed. The $CH_3OH$ lasing medium outputs a beam with a wavelength of 119 microns. Dimensions of a rectangular tube 54 used in a preferred embodiment of the present invention are shown in FIG. 2. The resonator housing 12 is preferably comprised of a 2.7 meter, 30 mm inner diameter pyrex tube with a coaxial coolant jacket 32 as shown in FIG. 2. A coolant 52 flows along and around the rectangular tube 54 and is confined by the jacket 32. The jacket 32 is preferably comprised of pyrex with a 54 mm outer diameter and an approximately 3 mm thick wall. Additional details of the resonator housing 12 are shown in the lateral, sectional view of FIG. 3.

An optical mount includes an input optical coupler 76 having a ZnSe window 72 and a gold coated, copper mirror 74 with a 4 mm diameter input aperture 74a or a gold coated CdTe hybrid input coupler with a 4 mm clear aperture. Another optical mount includes an output optical coupler 66 disposed on the output end of the resonant housing 12 having a Z-cut quartz window 68 and a silicon mirror 70. Most of the laser beam is reflected by the silicon mirror 70, with a portion of the beam exiting the resonant cavity 56 via the quartz window 68. The copper mirror 74 in the input coupler 76 functions as a dichroic mirror similar to the silicon mirror 70 in the output coupler 66 on the output end of the resonator housing 12. The silicon hybrid output coupler 70 is preferably coated with gold and includes a 6 mm diameter clear aperture 70a therein. The Z-cut quartz window 68 is disposed on an outer portion of the silicon hybrid coupler 70 and over the aperture 70a therein. The output laser beam of the $CO_2$ pump laser 14 is provided to the resonant housing via the input optical coupler 76. A vacuum pump 39 coupled to the inner rectangular tube 54 continuously removes $CH_3OH$ from the tube.

The optical mounts retaining the input and output couplers 76, 66 are maintained at room temperature using circulating water from a closed water system including a temperature controlled reservoir and water pump (not shown). The circulating water system ensures long term stability of FIR laser output power and prevents the formation of frost on the input and output couplers 76, 66 caused by an antifreeze coolant 52 circulating within resonator housing 12. Resonator wall temperature is controlled by a chiller 38 which circulates the coolant 52 such as antifreeze through the resonator housing 12 and the rectangular shaped tube 54 therein. The rectangular tube 54 extends the full length of the resonator housing 12 and is mounted at respective ends to the input coupler 76 and the output coupler 66. The chiller 38 is preferably capable of maintaining the walls of the resonant cavity 56 at room temperature or of even lowering the resonator wall temperature to as low as $-10°$ C. in the presence of an approximately 100 watt pump input beam. Table I contains $CO_2$ laser parameters, while Table II sets forth FIR laser parameters in a preferred embodiment of the present invention.

TABLE I

| $CO_2$ LASER PARAMETERS | |
|---|---|
| Line | 9 μm |
| Power | 130 Watts (Max.) |
| Cavity Length | 2.0 Meters |
| Discharge Length | 1.67 Meters |
| Bore | 12 mm |
| Grating | 130 l/mm |
| Output Coupler | 10 M Radius, 80% Reflectivity, ZnSe |
| Gas Mixture, Power | 6% $CO_2$ 17% $N_2$ 77% He, 120 Watts 22 KV, 45 ma, 12% eff. |
| Operating Point | 6% $CO_2$ 17% $N_2$ 77% He 1% Xe |
| Efficiency | 130 Watts, 18 KV, 60 ma, 12% eff. |
| Flow Rate | 14 CFM Pump |
| Electrodes | Ni |
| Important Features | No Brewster Windows |
| For Power/Mode | PZT External to Vac. |
| Quality | No restrictions in gas flow |

TABLE II
FIR LASER PARAMETERS

| | |
|---|---|
| Line | 119 μm (CH₃OH) |
| Power | 830 mW (Max.) |
| Cavity Length | 2.67 Meters |
| Flow Rate | 14 CFM Pump |
| Bore | 25 mm |
| Output Coupler | Si Hybrid Coupler, 10 mm Aperture |
| Input Coupler | Gold Coated Copper 4 mm Aperture |
| | Gold Coated CdTe, 4 mm Aperture |

The chiller 38 typically includes a pump and a fluid temperature controller (not shown for simplicity). Use of the chiller 38 at −10° C. increases FIR laser output on the order of 10–20%. An electric field on the order of 500–600 V is applied to the CH₃OH gas within the inner rectangular tube 54 in the resonant cavity 56 by means of upper and lower electrodes 58, 60. As shown in FIG. 2, each of the upper and lower electrodes 58, 60 is preferably comprised of nickel-plated, brass and is attached by conventional means such as an epoxy cement to an inner surface of the rectangular tube 54 along the length thereof. The upper and lower electrodes 58, 60 are further coupled to a voltage source disposed outside of the resonator housing 12 by means of an electrical feedthrough connection at the output end of the housing as described below.

Also disposed within the resonant cavity 56 are first and second conductive layers 62, 64 on facing inner surfaces of the rectangular tube 54. Each of the conductive layers 62, 64 serves as a reflective and conductive coating to confine the electric field within the rectangular tube 54. Because the first and second electrodes 58, 60 are disposed within the rectangular tube 54, the walls of the resonator housing 12 and the inner rectangular tube can be cooled without electrical breakdown of the coolant 52 circulating through the resonator housing during the application of the Stark field between the electrodes. Wall cooling, in turn, allows for increased FIR laser output powers.

Figure 4:
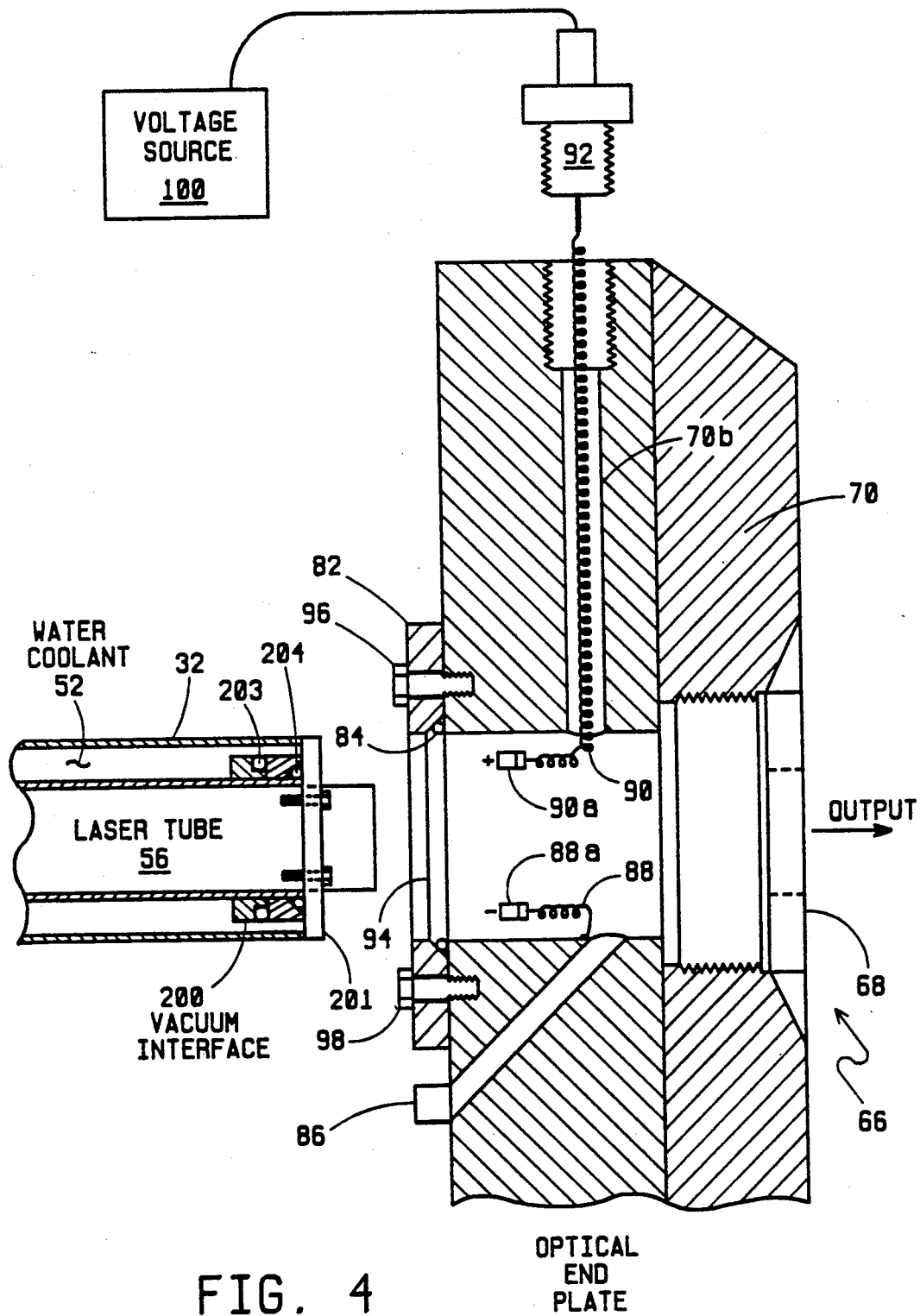
FIG. 4 is a sectional view illustrating details of the optical output coupler and sealed end portion of the resonator housing employed in a preferred embodiment of the present invention.

Referring to FIG. 4, there is shown a sectional view illustrating details of the output coupler 66 used in a preferred embodiment of the present invention. As described above, the output coupler 66 includes an inner silicon hybrid coupler 70 and an outer Z-cut quartz window 68. Securely coupled by means of first and second mounting pins 96, 98 to the inner surface of the silicon hybrid coupler 70 is a seal 82. The seal 82 includes a center aperture in which is disposed an optical window 94 through which the output laser beam passes. An O-ring 84 is disposed in sealed relation between the seal 82 and the inner surface of the silicon hybrid coupler 70. The seal 82 and 0-ring 84 combination provides a vacuum-and water-tight seal for the output coupler 66. The output coupler 66 may be securely attached in a sealed manner to an end of the resonator housing 12 by conventional means such as a weldment or mounting pins, with suitable vacuum and water seals disposed therebetween. Details of the sealed coupling between input coupler 76 and output coupler 66 and the resonator housing 12 are not shown for simplicity, as such details are well known to those skilled in the relevant arts.

Disposed within the silicon hybrid coupler 70 is a feedthrough channel 70b as well as a gas port 86. Attached in a threaded manner to the distal end of the feedthrough channel 70b is an insulated seal/feedthrough 92. A first grounded lead 88 is attached at one end to the silicon hybrid coupler 70 and at its other end to a stainless steel clip 88a. A second positive lead 90 is positioned within and extends through the insulated seal/feedthrough 92. Coupled to the proximal end of the second positive lead 90 is a second stainless steel clip 90a which is attached to a first upper brass electrode 58 within the resonant cavity 56. A second lower brass electrode 60 is coupled to grounded clip 88a. The voltage is then raised to several hundred volts creating the Stark effect and the splitting of the power peak shown in FIG. 10 in increasing the bandwidth to 10 MHz. A voltage source 100 is coupled via the second positive lead 90 and clip 90a combination to one of the aforementioned brass electrodes within the resonant cavity, while the second brass electrode is coupled to neutral ground potential via the first lead 88 and grounding clip 88a combination. It is in this manner that an electric field is applied across the resonant cavity 56 to realize the Stark-effect frequency splitting of a spectral line of the lasing gas therein. A suitable gas port may also be provided in the seal/feedthrough 92 to allow a buffer gas to be introduced into the resonant cavity via feedthrough channel 70a and gas port 86. The output coupler 66 thus provides a gas and water sealed attachment to the end of the resonator housing 12, while allowing for transmission of the output laser beam and accommodating electrical and gas feedthroughs to the resonant cavity 56 within the resonator housing.

A pressure plate 201 is screwed down compressing the O-ring seal 204. Component 204 is disposed in contact with the outside of the resonant cavity 56 to form a vacuum seal. Vacuum interface 200 is pushed inside the coolant water jacket 32 compressing an O-ring 203 against the inside surface of the coolant jacket and vacuum interface 200 to form a coolant seal. Seal 82 compresses O-ring 84 around the coolant jacket 32 and the optical end plate so as to separate the resonant cavity 56 and the inside of the optical end plate which is under vacuum from atmosphere.

Figure 5:
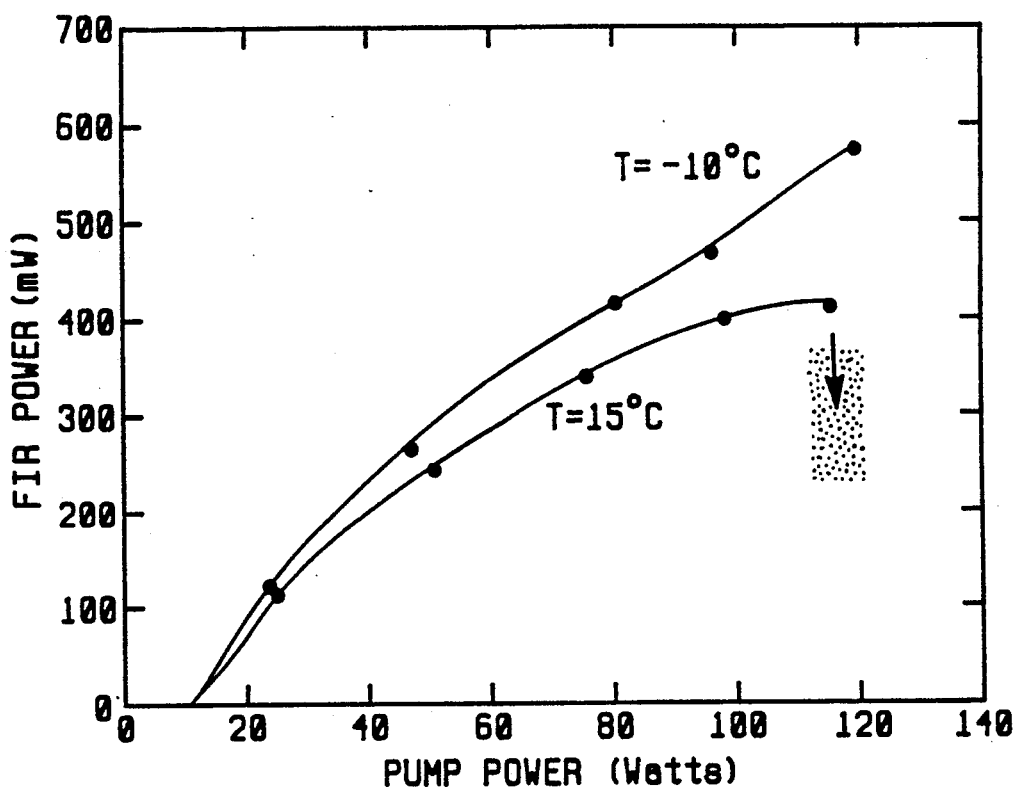
FIG. 5 is a graphic representation of the variation of FIR laser output power with FIR resonator wall cooling.

Output beam power is a function of the rate at which heat can be removed, or dissipated, from the resonant cavity 56. The effect of FIR resonator wall cooling on FIR output power as graphically illustrated in FIG. 5. The arrow in this figure indicates that as coolant flow is reduced or coolant temperature is allowed to rise, FIR laser output power drops dramatically in a matter of minutes to the patched areas shown on the graph as the FIR resonant cavity temperature increases. Even maintaining the resonant cavity 56 at room temperature has a beneficial effect in terms of increased output power.

Figure 6:
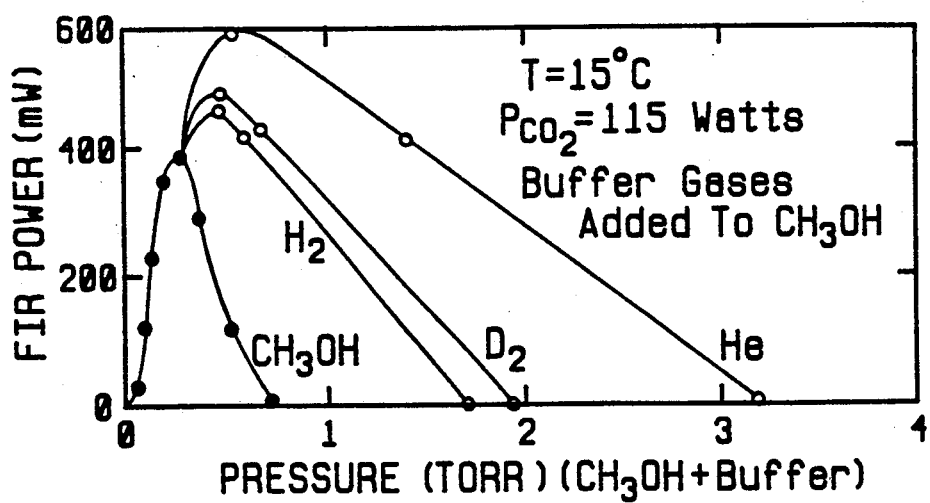
FIGS. 6, 7 and 8 graphically illustrate the variation of FIR laser output power with various buffer gases added to the FIR laser gas.
Figure 7:
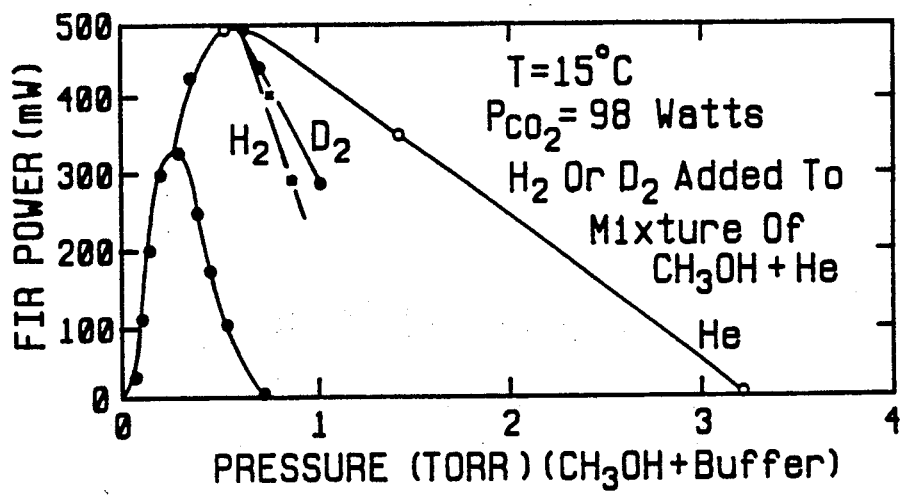
Figure 8:
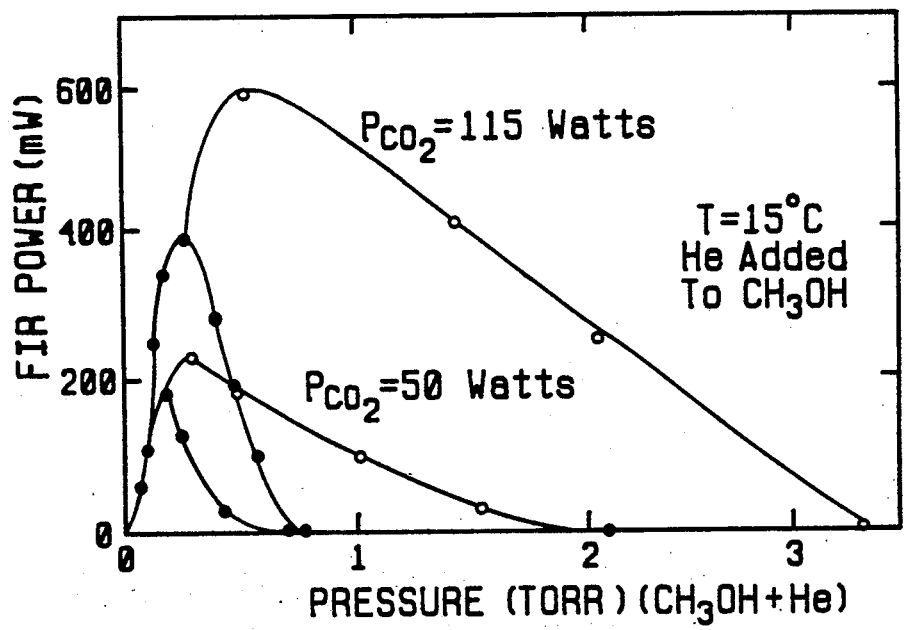

Referring to FIGS. 6, 7 and 8, there is shown the effects of FIR output power with the addition of various simple buffer gases at the output of the resonator housing 12. The buffer gas may be delivered to the exit end of the resonator housing 12 by means of a buffer gas source 30 coupled to the resonant cavity 56 as previously described. The measurements graphically illustrated in FIGS. 6, 7 and 8 were taken with the laser pump power as well as the FIR resonator cavity wall temperature maintained constant. The pressure of the CH₃OH gas within the resonant cavity 56 was fixed at a predetermined value, while the pressure of the buffer gas added to the CH₃OH was varied. The buffer gas increases the breakdown voltage of the CH₃OH gas permitting the realization of greater laser output power.

As shown in FIG. 8, He is the most effective of the simple buffer gases employed, while $H_2$ and $D_2$ exhibited roughly similar behavior. In all three cases, the most effective $CH_3OH$ pressure at which these simple molecules could be added was also the $CH_3OH$ pressure at which the FIR laser output was maximum in the absence of a buffer gas. This latter phenomena occurred at all pump powers investigated. Further, below this pressure adding a buffer gas always resulted in an output power decrease. It appears that these buffer gases enhance the FIR output by breaking up a vibrational bottleneck rather than by reducing the ambient temperature of the gas. If temperature reduction were the dominant mechanism, an enhancement could be expected across the entire power versus pressure curve as has been observed by others for the case of $NH_3$.

Figure 9:
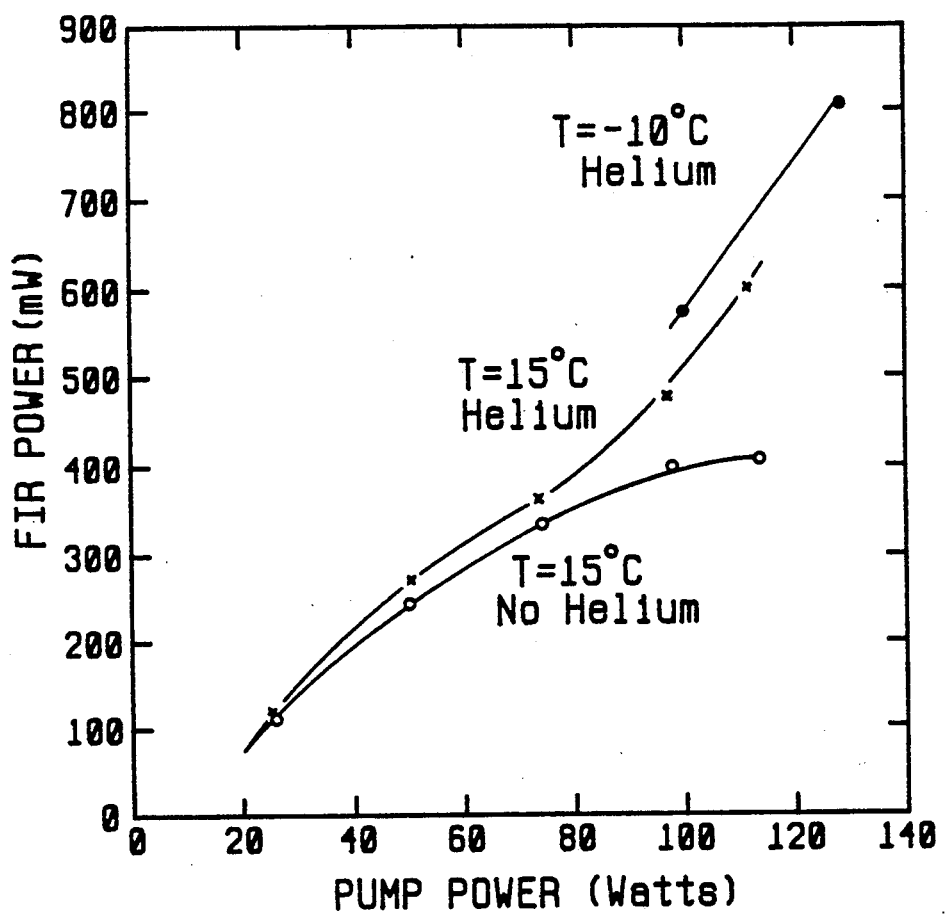
FIG. 9 graphically shows the complementary effects of the addition of a He buffer gas and resonator wall cooling on FIR laser output power.
Figure 10:
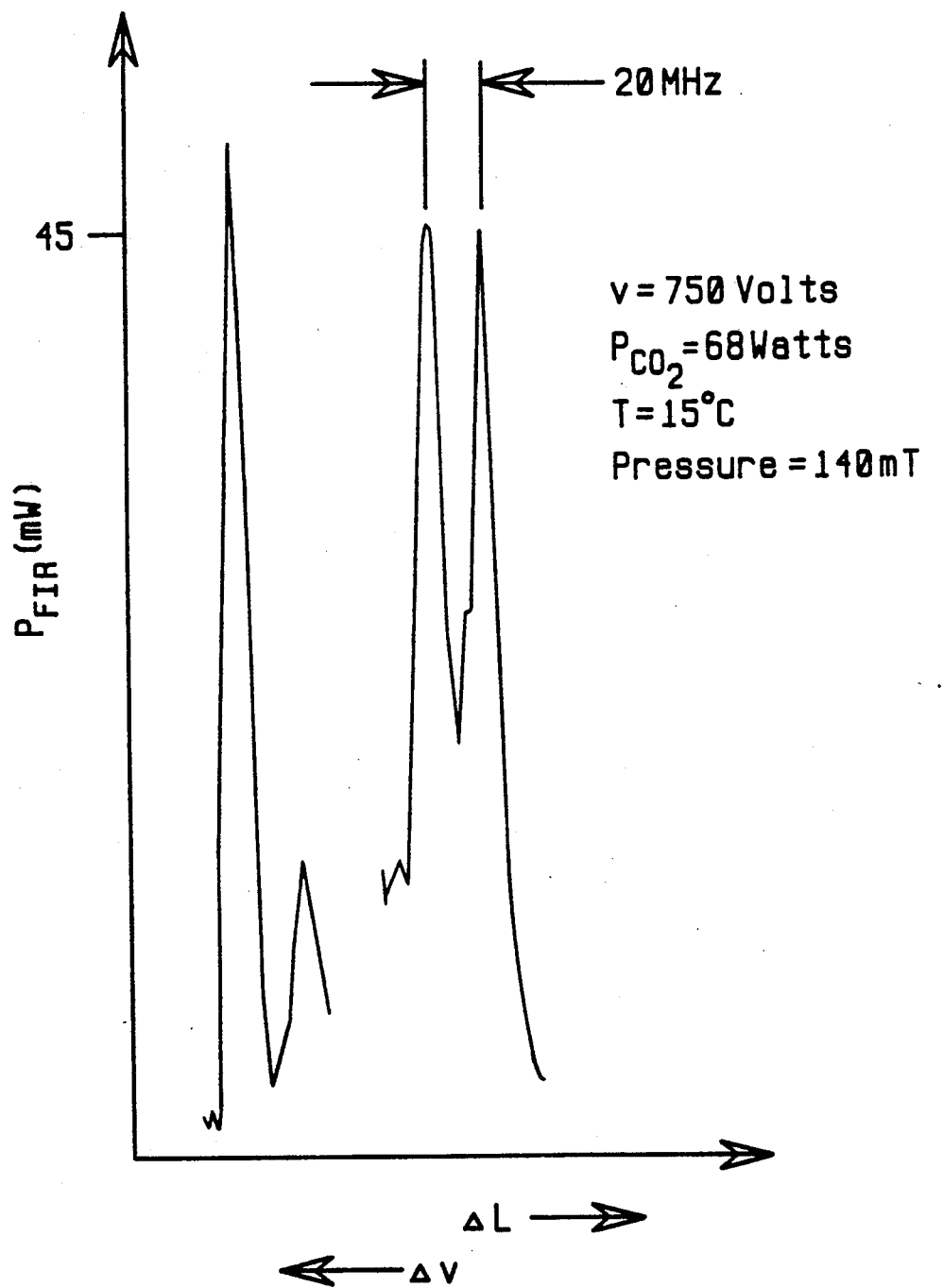
FIG. 10 is a graphic representation of the output power spectrum of an FIR laser with a modulated output beam of 20 MHz in accordance with the present invention.

FIGS. 9 and 10 illustrate additional characteristics of the output power of the Stark-tuned FIR laser of the present invention under various other operating conditions. For example, FIG. 9 graphically illustrates the increase in net output power observed with a simple buffer gas. FIG. 9 also illustrates the complementary effects of the introduction of a buffer gas and resonant cavity wall cooling. From the figure, it can be seen that FIR power is substantially increased with the addition of He as a buffer gas to the $CH_3OH$ laser gas. The measured data of FIG. 9 also indicates that substantially higher FIR output powers are available by reducing resonant cavity wall temperature from 15° C. to $-10°$ C. Combining these two enhancement techniques, i.e., wall cooling and buffer gas addition, allows for the attainment of ~830 mW of FIR power which is roughly double the power generated without these enhancement techniques. This power represents ~16% of the maximum attainable power given by the Manley-Rowe condition.

Referring to FIG. 10, there is shown the variation in output power as a function of modulation frequency for various other operating parameter values for the Stark-tuned FIR laser of the present invention. The measured data shows that a bandwidth of pf 20 MHz was achieved at FIR output powers in excess of 45 mW. The single peak on the left illustrates the very narrow bandwidth of the output laser beam without an electric field applied. Upon application of a Stark voltage, a 20 MHz bandwidth is realized.

There has thus been shown a Stark-tuned FIR laser incorporating resonant cavity wall temperature control for substantially increasing the output efficiency of the $CH_3OH$ 119 micron line for all pump powers. The FIR laser is particularly adapted for use in high frequency modulated interferometry and further contemplates the addition of various simple buffer gases ($H_2$, $D_2$, He) for further increasing and stabilizing laser output power. The wall temperature control and buffer gas addition techniques are complementary and allow for high power FIR laser operation in which FIR output varies linearly with pump power. This suggests that the pump absorption is not saturated in the high power regime (as it is without cooling or buffer gas addition) and that with slightly more pump power than incorporated in the present invention, a 1 Watt FIR laser can be realized. Because of its high output power and wideband measuring capability, the inventive laser is particularly adapted for use in multi-channel interferometers such as employed in large-scale magnetic fusion devices for measuring plasma density.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. Apparatus for providing a high frequency modulated beam to an interferometer, said apparatus comprising:
   a housing having an input optical coupler and an output optical coupler disposed on respective opposed ends thereof and a channel extending the length thereof;
   means for defining a resonant cavity within the channel of said housing, wherein said cavity contains an active gas and said means for defining said resonant cavity includes an elongated closed tube;
   sealed coupling means disposed in said output optical coupler for connecting an electrical conductor extending into said resonant cavity to a voltage source;
   means for exciting said gas to a lasing state;
   charged means coupled to said voltage source via said electrical conductor and disposed within said cavity for applying an electric field to said gas in the lasing state to split a frequency of said gas into first and second frequencies and provide a high frequency modulated beam with a modulation frequency equal to the difference between said first and second frequencies from the output end of said housing to an interferometer; and
   temperature control means including a coolant disposed within the channel in said housing and about and in contact with said elongated closed tube for preventing electrical breakdown of said gas upon the application of large electric fields thereto.

2. The apparatus of claim 1 wherein said charged means includes first and second charged electrodes arranged in a spaced, opposed manner in said resonant cavity.

3. The apparatus of claim 2 wherein each of said charged electrodes comprises a vacuum evaporated layer of aluminum.

4. The apparatus of claim 2 wherein each of said charged electrodes in a nickel plated brass plate.

5. The apparatus of claim 4 further comprising a vacuum evaporated layer of aluminum disposed on an inner surface of said resonant cavity between adjacent portions of each of said brass plates.

6. The apparatus of claim 2 wherein said housing is generally cylindrical and said resonant cavity has a generally rectangular cross section.

7. The apparatus of claim 1 wherein said temperature control means further includes circulation means for displacing said coolant in a floating manner within said channel.

8. The apparatus of claim 1 wherein said housing is generally cylindrical.

9. The apparatus of claim 8 wherein said input optical coupler includes a ZnSe window in combination with a copper mirror having an aperture therein.

10. The apparatus of claim 9 further comprising a laser pump coupled to said input optical coupler for directing a laser beam into said resonant cavity for providing energy to the gas therein.

11. The apparatus of claim 9 wherein said laser pump comprises a $CO_2$ laser.

12. The apparatus of claim 12 wherein said output optical coupler comprises a silicon hybrid coupling in combination with a quartz window.

13. The apparatus of claim 8 further comprising temperature control means coupled to said input and output optical couplers for maintaining said optical couplers at room temperature.

14. The apparatus of claim 13 wherein said temperature control means comprises a closed liquid circulation system coupled to each of said optical couplers.

15. The apparatus of claim 1 further comprising a buffer gas source coupled to said resonant cavity for mixing a buffer gas with the gas in said resonant cavity for increasing the electrical breakdown voltage of said gas in the lasing state and the frequency of said output laser beam.

16. The apparatus of claim 15 wherein said gas in the lasing state is $CH_3OH$ and said buffer gas is $H_2$.

17. The apparatus of claim 15 wherein said gas in the lasing state is $CH_3OH$ and said buffer gas in $D_2$.

18. The apparatus of claim 15 wherein said gas in the lasing state is $CH_3OH$ and said buffer gas is He.

19. A far-infrared (FIR) laser having a modulated laser output beam with a large bandwidth, said FIR laser comprising:

a housing defining an elongated channel and including an input optical coupler and an output optical coupler;

means for defining a cavity including an elongated closed tube disposed within said housing and containing a first active gas;

laser pump means for directing an input laser beam into a first end of said cavity via said input optical coupler for causing said first gas to emit electromagnetic energy at a first frequency;

first and second electrodes disposed in a spaced manner in said cavity for applying an electric field to said gas for splitting said first frequency into second and third frequency signals and outputting a modulated laser output beam formed by beating said second and third frequency signals together from a second end of said cavity via said output optical coupler;

temperature control means including a coolant disposed within said channel and in contact with said tube for cooling said tube in preventing an electrical breakdown of said first gas upon application of the electric field thereto;

means for introducing a buffer gas into said cavity for mixing with said first gas for further reducing the possibility of electrical breakdown of said first gas; and sealed coupling means disposed in said output optical coupler and coupled to a voltage source and to said means for introducing a buffer gas into said cavity for connecting said first and second electrodes to said voltage source and for directing the buffer gas into said cavity.

* * * * *